US009536074B2

(12) United States Patent
Boldyrev et al.

(10) Patent No.: US 9,536,074 B2
(45) Date of Patent: Jan. 3, 2017

(54) METHOD AND APPARATUS FOR PROVIDING SINGLE SIGN-ON FOR COMPUTATION CLOSURES

(75) Inventors: Sergey Boldyrev, Söderkulla (FI); Ian Justin Oliver, Söderkulla (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1275 days.

(21) Appl. No.: 13/073,696

(22) Filed: Mar. 28, 2011

(65) Prior Publication Data

US 2012/0222104 A1    Aug. 30, 2012

Related U.S. Application Data

(60) Provisional application No. 61/447,207, filed on Feb. 28, 2011.

(51) Int. Cl.
| | |
|---|---|
| G06F 7/04 | (2006.01) |
| G06F 21/41 | (2013.01) |
| H04L 29/06 | (2006.01) |
| H04L 29/08 | (2006.01) |

(52) U.S. Cl.
CPC ........... *G06F 21/41* (2013.01); *H04L 63/0815* (2013.01); *H04L 67/1097* (2013.01)

(58) Field of Classification Search
USPC ........................................................ 726/8
See application file for complete search history.

(56) References Cited

U.S. PATENT DOCUMENTS

| | | | |
|---|---|---|---|
| 7,426,642 B2 | 9/2008 | Aupperle et al. | |
| 7,631,346 B2* | 12/2009 | Hinton et al. | 726/8 |
| 2009/0106055 A1 | 4/2009 | Demczuk et al. | |
| 2009/0249439 A1* | 10/2009 | Olden et al. | 726/1 |
| 2010/0131755 A1 | 5/2010 | Zhu et al. | |
| 2011/0087888 A1* | 4/2011 | Rennie | 713/182 |
| 2011/0138453 A1* | 6/2011 | Verma et al. | 726/8 |
| 2011/0277027 A1* | 11/2011 | Hayton et al. | 726/8 |
| 2012/0011578 A1* | 1/2012 | Hinton et al. | 726/8 |

FOREIGN PATENT DOCUMENTS

| | | |
|---|---|---|
| CN | 101567878 A | 10/2009 |
| WO | WO 2005/064882 A2 | 7/2005 |

(Continued)

OTHER PUBLICATIONS

"Force10 Uses Intel Expressway Cloud Access 360 for Cloud-Bursting and Saas Application Deployment," Force10 Networks, May 4, 2011, pp. 1-2.

(Continued)

*Primary Examiner* — Teshome Hailu
(74) *Attorney, Agent, or Firm* — Ditthavong & Steiner, P.C.

(57) ABSTRACT

An approach is provided for providing single sign-on for computation closures. A single sign-on management platform determines to create a single sign-on computation closure in response to an initiation of a single sign-on authentication session. The single sign-on management platform also determines one or more computation entities that are to execute at least one other computation closure under the single sign-on authentication session. The single sign-on management platform further causes, at least in part, a transfer of the single sign-on computation closure to the one or more computation entities.

20 Claims, 11 Drawing Sheets

(56) References Cited

FOREIGN PATENT DOCUMENTS

WO     WO 2006/103176 A1    10/2006
WO     WO 2007/024626 A1     3/2007

OTHER PUBLICATIONS

"TRACT Integrates with OneLogin for Cloud-Based Single Sign-On," SaaSChronicles, Jul. 14, 2011, pp. 1-6.
Nguyen et al., "A Cloud-Oriented Cross-Domain Security Architecture," 2010 Military Communications Conference, 2010, pp. 1701-1707.

* cited by examiner

METHOD AND APPARATUS FOR PROVIDING SINGLE SIGN-ON FOR COMPUTATION CLOSURES

RELATED APPLICATIONS

This application claims the benefit of the earlier filing date under 35 U.S.C. §119(e) of U.S. Provisional Application Ser. No. 61/447,207 filed Feb. 28, 2011, entitled "Method and Apparatus for Providing Single Sign-on for Computation Closures," the entirety of which is incorporated herein by reference.

BACKGROUND

Mobile devices with various methods of connectivity are now for many people becoming the primary gateway to the internet and also a major storage point for personal information. This is in addition to the normal range of personal computers and furthermore sensor devices plus internet based providers. Combining these devices together and lately the applications and the information stored by those applications is a major challenge of interoperability. This can be achieved through numerous, individual and personal information spaces in which persons, groups of persons, etc. can place, share, interact and manipulate (or program devices to automatically perform the planning, interaction and manipulation of) webs of information with their own locally agreed semantics without necessarily conforming to an unobtainable, global whole.

Furthermore, in addition to information, the information spaces may be combined with webs of shared and interactive computations or computation spaces so that the devices having connectivity to the computation spaces can have the information in the information space manipulated within the computation space environment and the results delivered to the device, rather than the whole process being performed locally in the device. It is noted that such computation spaces may consist of connectivity between devices, from devices to network infrastructure, to distributed information spaces so that computations can be executed where enough computational elements are available. These combined information spaces and computation spaces often referred to as computation clouds, are extensions of the 'Giant Global Graph' in which one can apply semantics and reasoning at a local level.

In one example, clouds are working spaces respectively embedded with distributed information and computation infrastructures spanned around computers, information appliances, processing devices and sensors that allow people to work efficiently through access to information and computations from computers or other devices. An information space or a computation space can be rendered by the computation devices physically presented as heterogeneous networks (wired and wireless). However, despite the fact that information and computation presented by the respective spaces can be distributed with different granularity, still there are challenges in certain example implementations to achieve scalable high context information processing within such heterogeneous environments. For example, in various implementations, due to distributed nature of the cloud, data, information, and computation elements (e.g., computation closures) are being exchanged among distributed devices within heterogeneous network environments wherein information with various levels of granularity and various structures is provided by and transmitted among various independent sources. In such environments, unique authentication and context validation for information, computation closures and computation entities at development time and at runtime, by unique signatures, throughout the distributed environment of the computation architecture is a very important issue.

SOME EXAMPLE EMBODIMENTS

Therefore, there is a need for an approach for providing single sign-on for computation closures, in order to be able to uniquely authenticate the computations and the entities executing the computations.

According to one embodiment, a method comprises determining to create a single sign-on computation closure in response to an initiation of a single sign-on authentication session. The method also comprises determining one or more computation entities that are to execute at least one other computation closure under the single sign-on authentication session. The method further comprises causing, at least in part, a transfer of the single sign-on computation closure to the one or more computation entities.

According to another embodiment, an apparatus comprises at least one processor, and at least one memory including computer program code, the at least one memory and the computer program code configured to, with the at least one processor, cause, at least in part, the apparatus to determine to create a single sign-on computation closure in response to an initiation of a single sign-on authentication session. The apparatus is also caused to determine one or more computation entities that are to execute at least one other computation closure under the single sign-on authentication session. The apparatus is further caused to cause, at least in part, a transfer of the single sign-on computation closure to the one or more computation entities.

According to another embodiment, a computer-readable storage medium carries one or more sequences of one or more instructions which, when executed by one or more processors, cause, at least in part, an apparatus to determine to create a single sign-on computation closure in response to an initiation of a single sign-on authentication session. The apparatus is also caused to determine one or more computation entities that are to execute at least one other computation closure under the single sign-on authentication session. The apparatus is further caused to cause, at least in part, a transfer of the single sign-on computation closure to the one or more computation entities.

According to another embodiment, an apparatus comprises means for determining to create a single sign-on computation closure in response to an initiation of a single sign-on authentication session. The apparatus also comprises means for determining one or more computation entities that are to execute at least one other computation closure under the single sign-on authentication session. The apparatus further comprises means for causing, at least in part, a transfer of the single sign-on computation closure to the one or more computation entities.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-8, 21-28, and 42-44.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing single sign-on for computation closures are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "computation closure" identifies a particular computation procedure together with relations and communications among various processes including passing arguments, sharing process results, flow of data and process results, etc. The computation closures (e.g., a granular reflective set of instructions, data, and/or related execution context or state) provide the capability of slicing of computations for processes and transmitting the computation slices between devices, infrastructures and information sources.

As used herein, the term "cloud" refers to an aggregated set of information and computation closures from different sources. This multi-sourcing is very flexible since it accounts and relies on the observation that the same piece of information or computation can come from different sources. In one embodiment, information and computations within the cloud are represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information and computations that is implemented in web resources; using a variety of syntax formats. Although various embodiments are described with respect to clouds, it is contemplated that the approach described herein may be used with other structures and conceptual description methods used to create distributed models of information and computations.

Figure 1:
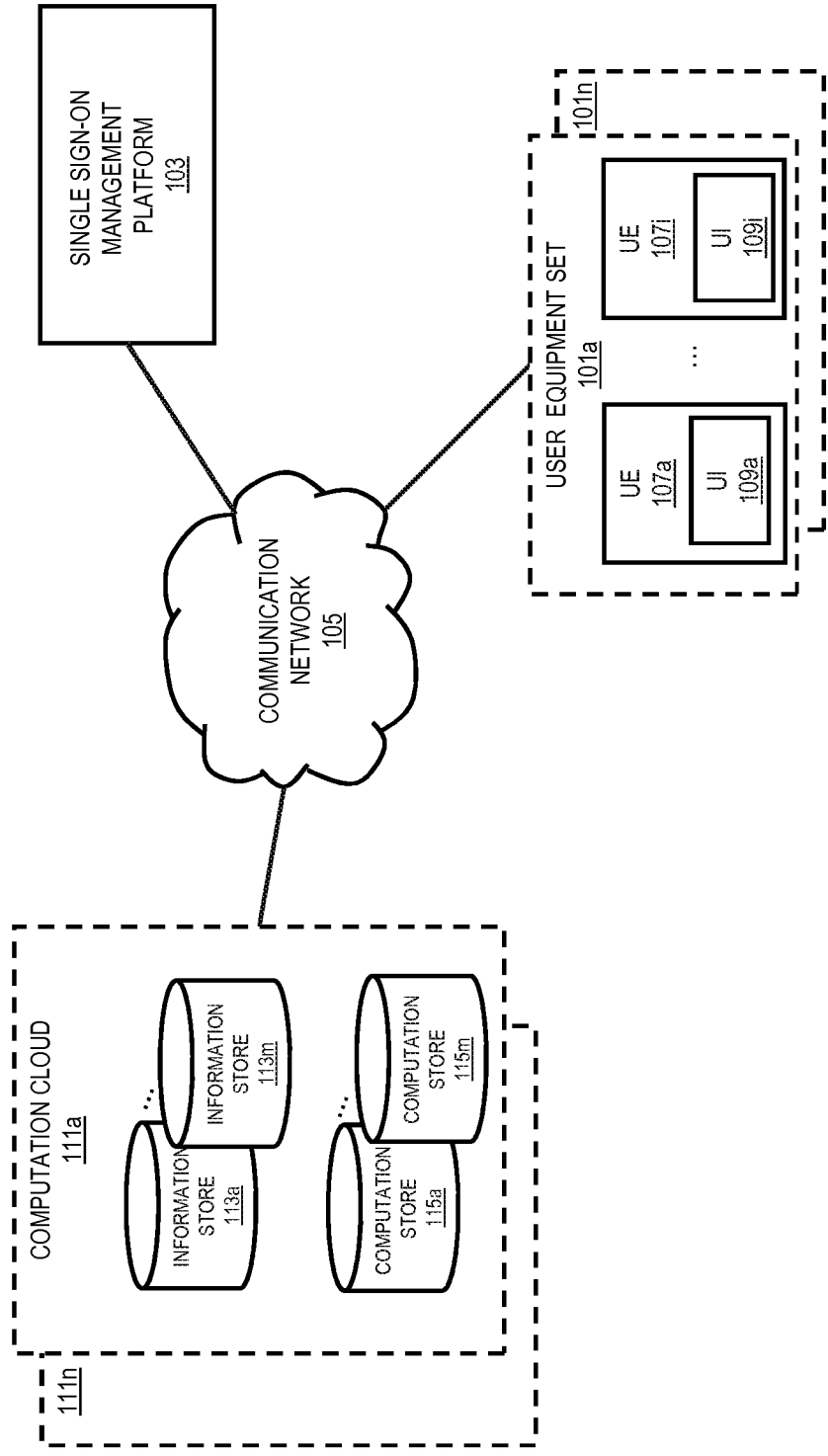
FIG. 1 is a diagram of a system capable of providing single sign-on for computation closures, according to one embodiment.

FIG. 1 is a diagram of a system capable of providing single sign-on for computation closures, according to one embodiment. As previously described, a cloud environment consists of information and computation resources each consisting of several distributed devices that communicate information and computation closures (e.g. RDF graphs) via a shared memory. A device within a cloud environment may store computation closures locally in its own memory space or publish computation closures on a globally accessible environment within the cloud. In the first case, the device is responsible for any process needed for combination or extraction of computations, while in the second case the processes can be conducted by the globally accessible environment which includes the device.

The basic concept of cloud computing technology provides access to distributed computations for various devices within the scope of the cloud, in such a way that the distributed nature of the computations is hidden from users and it appears to a user as if all the computations are performed on the same device. The cloud computing also enables a user to have control over computation distribution by transferring computations between devices that the user has access to. For example, a user may want to transfer computations among work devices, home devices, and portable devices, other private and public devices, etc. Current technologies enable a user of a mobile device to manipulate contexts such as data and information via the elements of a user interface of their user equipment. However, distribution of computations and processes related to or acting on the data and information within the cloud is typically controlled by the system. In other words, a cloud in general does not provide a user (e.g., an owner of a collection of information distributed over the information space) with the ability to control distribution of related computations and processes of, for instance, applications acting on the information. For example, a contact management application that processes contact information distributed within one or more clouds generally executes on a single device (e.g., with all processes and computations of the application also executing on the same device) to operate on the distributed information. In some cases (e.g., when computations are complex, the data set is large, etc.), providing a means to also distribute the related computations in addition to the information is advantageous.

This goal is achieved by introduction of the capability to construct, distribute, and aggregate computations as well as their related data. More specifically, to enable a user of a cloud (e.g., a mobile device user, an application developer, etc.) who connects to the cloud via one or more devices, to distribute computations among the one or more user devices or other devices with access to the cloud, each computation is deconstructed to its basic or primitive processes or computation closures. Once a computation is divided into its primitive computation closures, the processes within or represented by each closure may be executed in a distributed fashion and the processing results can be collected and aggregated into the result of the execution of the initial overall computation.

In one embodiment, a distributed computational architecture consists of a plurality of architectural levels such as, for example, a device level, and infrastructure level, a cloud computing level, etc. A device from the device level has connectivity to the cloud computing level via one or more infrastructure levels, wherein each infrastructure level may consist of layers and components such as backbones, routers, base stations, etc. Typically, the computation closures associated with a process related to a device from device level are defined, constructed, and executed within other computing levels which may have various levels of distribution as well. However, components of a distributed architectural environment each may differ in configuration, communication capability, policies applied in terms of ownership, privacy and security of distributed computations, etc.

In one embodiment, a distributed computation architecture includes mechanism for secure dispersing, processing and assembling of computations around a number of physical or logical components by associating signatures to the computations. The closures may be signed and those signatures utilized for providing secure means for communication between devices, devices to infrastructures, or infrastructures to clouds. Signatures are entities that are generated by means of isomorphic transformations thus represent domain independent fragments that could be interpreted in some cases as at least meaningful information sets. Furthermore, distribution, access and execution of computation closures among components and levels of a distributed architectural environment may require compatibility among policies and rules of security imposed by various components and levels of architecture.

In one embodiment, different components of each architectural level support different types of closures with different levels and/or types of security defined, enforced, or a combination thereof. Each component (e.g. infrastructure component, node) may have a number of previously created secure entities, closures, links, and distribution paths for the distribution and execution of the computation closures such as connectors between closures, multiple branches, interaction points, rules, etc., that can significantly affect the efficiency of distribution and execution of computations and security of the computations in distributed architectures.

In one embodiment, the computations can be transferred and/or expanded from one component to another or from an architectural level to another (e.g. from infrastructure to cloud). Components and levels of distributed computation architectures may be equipped with signature mechanisms in order to sign computations and verify signatures by other components to ensure computation security. For example, computations signed by unknown or unapproved entities may be regarded as illegitimate. However, various signature mechanisms may be based on different rules, verification methods, encoding and decoding mechanisms, etc.

Therefore, there is a challenge to authenticate computation closures and computation entities in a distributed computation environment when each closure and/or each computation entity may have a different signature mechanism or verification method.

To address this problem, a system 100 of FIG. 1 introduces the capability to provide single sign-on for computation closures and computation entities. A computational architecture environment consists of different levels of proactive computational entities available for various levels of the computational architecture. Since these computational entities provide various levels of functionality for each of the levels of the architecture, providing different levels of distribution of the computational closures within the computational architecture enables the execution of the computational closures after the least required level of distribution. However, a very important functionality for execution of computational closures is to detect, identify, and determine computation security and to ensure security of computational closures, by creating compatibility among various types and levels of existing security measures at each part of the distributed computational architecture and to determine secure paths for the distribution of computations.

In one embodiment, a cloud may include a superset of closure elements (e.g. closure primitives) while other computation entities may have subsets of, and therefore the cloud may be capable of supporting computational closures and their security more effectively compared to other entities.

In one embodiment, device setup at various architectural levels such as security settings, quality of service (QOS) settings, class of service (COS) settings, priority settings etc., may affect direction and method of computational closure distribution, as different setups may lead to different situations and different available secure distribution paths and requirement. Additionally, computation closures' security can be indirectly affected by other features of architectural levels such as privacy settings, security enforcement strategies for computational entities, etc. On the other hand, ensuring secure distribution between different architectural levels and components can be achieved by different levels of computation distribution.

In one embodiment, certain amount of computation functionality can be transferred among levels and components of distributed computation architecture. For example, for computations associated with a public device that is used commonly by multiple users, a strict security measure may not be necessary, while private and confidential computations may require more advanced security measures (e.g. signatures).

In another embodiment, when a computation entity has a limited security support capability, the computations may be transferred to a next nearest entity with higher security capabilities where computation can continue, and redistributed to the cloud level if there is no entity with sufficient security support capability. It is noted that different device setups, limits and configurations may change the direction of computation closure distribution, as security support capability can be different.

In one embodiment, operations can be performed to determine and compare security of computation closure processes and security capabilities of computation entities. It can also be determined where it is more cost effective to transfer computation closures to, what the acceptable range of security for one or a group of computation closures is (taking into account other capabilities relevant for the computation such as privacy levels and rules, energy issues like battery vs. main power plug connection, etc). Furthermore, each signature can be associated with a security level so that proper signatures can be assigned to computations based on their security requirements.

In one embodiment, in a distributed computation environment any process within a run time environment can be captured, analyzed and sliced into particular pieces (computation closures) for further execution within remote run time environments.

In another embodiment, a single sign-on (SSO) mechanism may be adopted so that computation closures and functional flows can be identified by unique signatures throughout the distributed environment of the distributed computation architecture. In this embodiment, a computation closure or a set of computation closures may be associated with a signature, wherein the signature is known and is verifiable by multiple components and levels of architecture throughout the environment of the distributed computation structure.

In another embodiment, components and levels of the distributed computation architectures (e.g. computation entities) can be encrypted, for example using an algorithm, providing single sign-on signatures unique to the signed computation entities. Such signatures can be decomposed and recombined for further analysis and reasoning within encrypted domain so that isomorphic transformation between original and encrypted domains is preserved.

In one embodiment, signing computation entities with unique signatures based on a single sign-on mechanism, wherein the single sign-on is verifiable throughout a distributed computation environment, provides secure and flexible mechanisms for authentication of distributed computation entities as well as distributed computations (e.g., computation closures).

As shown in FIG. 1, the system 100 comprises a set 101 of user equipments (UEs) 107a-107i having connectivity to single sign-on management platform 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the UEs 107a-107i are respectively equipped with one or more user interfaces (UI) 109a-109i. Each UI 109a-109i may consist of several UI elements (not shown) at any time, depending on the service that is being used. UI elements may be icons representing user contexts such as information (e.g., music information, contact information, video information, etc.), functions (e.g., setup, search, etc.) and/or processes (e.g., download, play, edit, save, etc.). These contexts may require certain sets of media dependent computational closures, which may affect the service, for example the bit error rate, etc. Additionally, each UI element may be bound to a context/process by granular distribution. In one embodiment, granular distribution enables processes to be implicitly or explicitly migrated between devices, computation clouds, and other infrastructure.

In one embodiment, process distribution can be initiated for example by means of unicast (e.g., to just another device) or multicast (e.g., to multiple other devices). For example one UE 107 may communicate with many infrastructures (or many components of many infrastructures), while many nodes of infrastructures may communicate with multiple clouds. Additionally, process distribution may be triggered via gesture recognition, wherein the user preselects a particular set of UI elements and makes a gesture to simulate "pouring" the selected UE elements from one device to another. In other embodiments, process distribution may be initiated automatically without direct user involvement and based on default setup by the manufacturer of the UE 107a-107i, previous setup by the user of the UE, default setup in an application activated on or associated with a UE 107a-107i, or a combination thereof.

As seen in FIG. 1, a user of UEs 107a-107i may own, use, or otherwise have access to various pieces of information and computations distributed over one or more computation clouds 111a-111n in information stores 113a-113m and computation stores 115a-115m where each of the one or more computation spaces 115a-115m include multiple sets of one or more computation closures. In one embodiment, the user may be an application developer that uses a UE 107a-107i to connect to the infrastructure and the cloud not only for accessing the services provided for end users but also for activities such as developing, distributing, processing, and aggregating various computations.

In one embodiment, the single sign-on management platform 103 controls and manages the signing, authentication and signature validation of computations in the computation stores 115a-115m of clouds 111a-111n, associated with UEs 107a-107i and of computation entities (not shown) which are components (e.g. processing units) of the distributed computation environment executing the computations.

In one embodiment, authentication of computations and computation entities may be initiated by the user, or based on a background activity for example by triggering a sequence of computation closures which in turn support distribution process. Prior to computation distribution the capabilities, including the security capabilities of computation entities performing the computations, are evaluated based on the single sign-on mechanism. If the authenticity of an entity cannot be approved, the evaluation may fail and the computation distribution to the entity may be terminated. The distribution flow to the entity may also be blocked so that further computations are not directed to the entity.

In one embodiment, no differentiation is distinguished between authentication of computations in development time and run time of the computation. The single sign-on management platform 103 provides early validation (at component level before the distribution) and contextual validation, wherein closure capabilities (e.g. energy consumption, security elements, privacy rules, etc.) can be represented as data. Additionally, the single sign-on management platform 103 may determine if certain entities have been modified so that all signatures associated with that entity can be evaluated and if necessary, isolated and marked as invalid.

In one embodiment, computation entities may be components of a network infrastructure (not shown) accessible by the UEs 107a-107i and by clouds 111a-111n via the communication network 105.

By way of example, the UEs 107a-107i, the single sign-on management platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
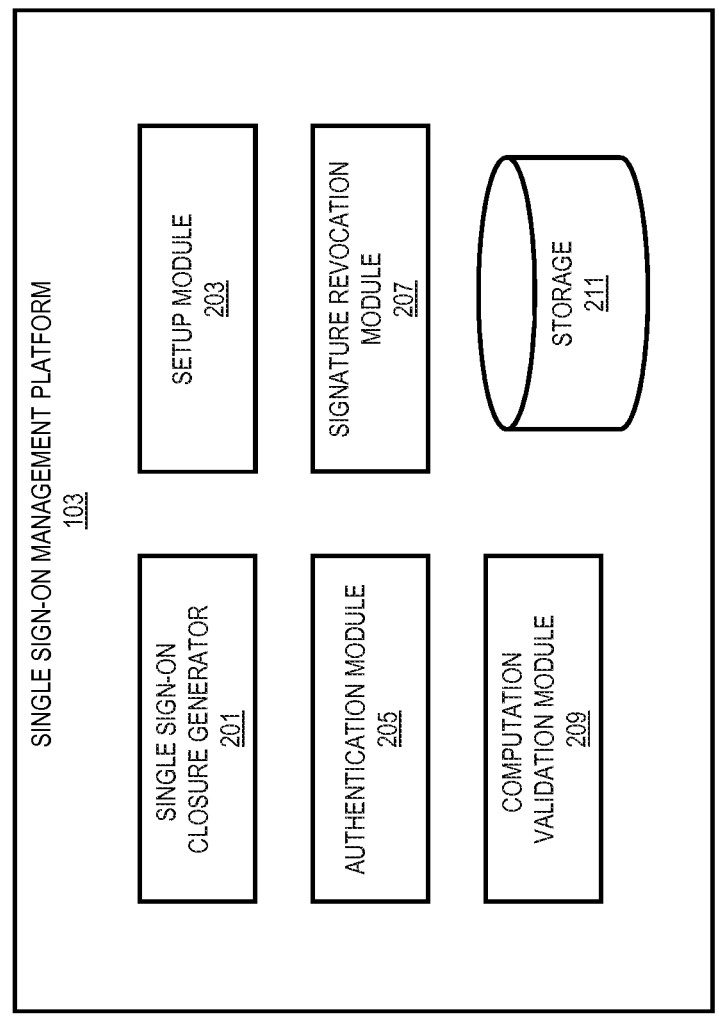
FIG. 2 is a diagram of the components of single sign-on management platform, according to one embodiment.

FIG. 2 is a diagram of the components of a single sign-on management platform, according to one embodiment. By way of example, the single sign-on management platform includes one or more components for providing single sign-on for computation closures. It is contemplated that the functions of these components may be combined in one or more components or performed by other components of equivalent functionality. In this embodiment, the single sign-on management platform includes a single sign-on closure generator 201, setup module 203, authentication module 205, signature revocation module 207, computation validation module 209, and storage 211.

Figure 3:
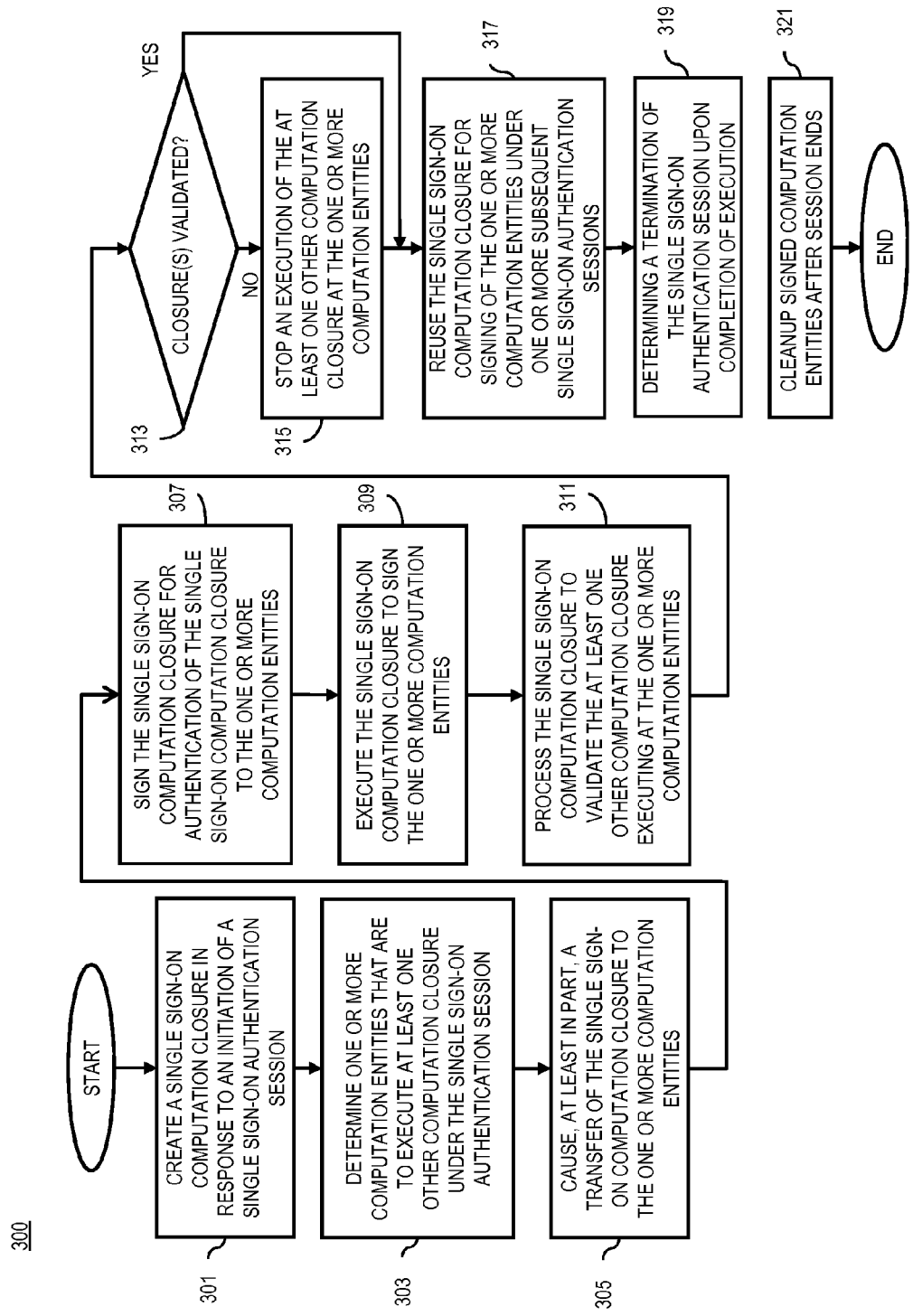
FIG. 3 is a flowchart of a process for providing single sign-on for computation closures, according to one embodiment.
Figure 10:
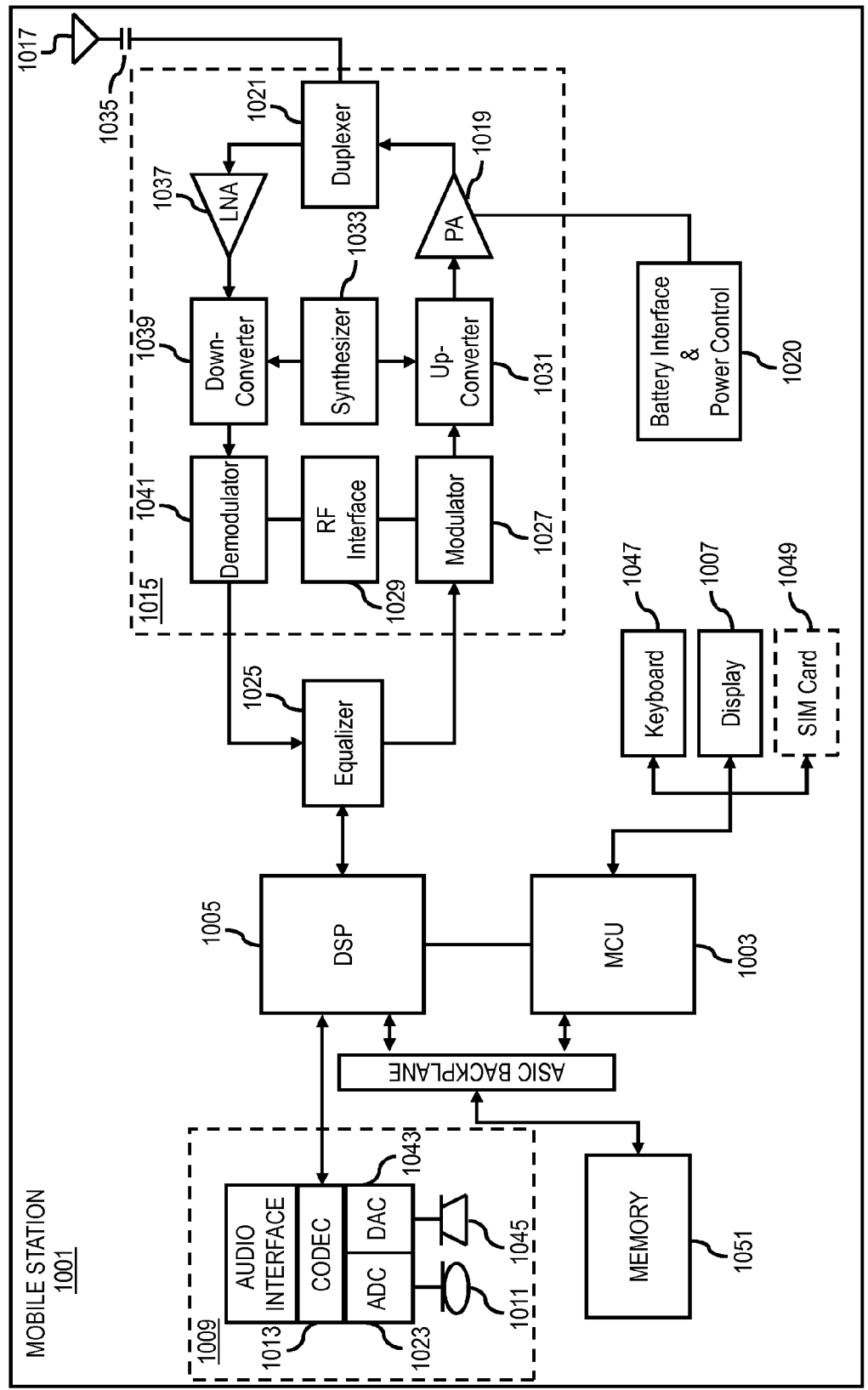
FIG. 10 is a diagram of a mobile terminal (e.g., handset) that can be used to implement an embodiment of the invention.

FIG. 2 is described with reference to FIG. 3, wherein FIG. 3 shows a flowchart 300 of a process for providing single sign-on for computation closures, according to one embodiment. In one embodiment, the single sign-on management platform performs the process 300 and is implemented in, for instance, a chip set including a processor and a memory as shown in FIG. 10. In one embodiment, as shown in step 301 of FIG. 3, the single sign-on closure generator 201 determines to create a single sign-on computation closure in response to an initiation of a single sign-on authentication session. As previously described the authentication session may be initiated by a user (e.g. application developer), a computation entity, a computation closure, an automated process, etc. or a combination thereof. For example, an authentication session may be initiated prior to the distribution of computations to a computation entity for being executed. Upon the initialization of an authentication session, the single sign-on closure generator 201 generates a single sign-on computation closure based on the supersets of information and computation closures available in computation clouds 111a-111n associated with the computations that are going to be distributed.

In step 303 of FIG. 3, the setup module 203 determines one or more computation entities that are to execute at least one other computation closure under the single sign-on authentication session. The one or more computation entities may be components of the distributed computation environment, including devices 107a-107i, execution components associated with clouds 111a-111n, or any entities with processing capabilities having connectivity to UEs 107a-107i and clouds 111a-111n via the communication network 105.

In one embodiment, the at least one other computation closure may be computation closures related to one or more processes associated with a service provided to the users of UEs 107a-107i within the environment of distributed computation. In other embodiments, the at least one computation closures may be any computations performed by the components of a distributed computation environment such as, for example, system procedures.

Per step 305 of FIG. 3, the setup module 203 causes, at least in part, transfer of the single sign-on computation closure to the one or more computation entities. In one embodiment, transfer of the single sign-on computation closure is propagated to the determined computation entities or to any computation entities involved in current user session.

In one embodiment, the single sign-on computation closure may be given a high priority level for the computation entities so that the computation entities receiving the single sign-on computation closure are required to be signed before being permitted to execute the one or more other closures associated with the session. In one embodiment, the computation entities may switch to a waiting mode to wait to be signed. In other embodiments, the computation entities may communicate with the single sign-on management platform requesting a signature.

In one embodiment, per step 307 of FIG. 3, the setup module 203 causes, at least in part, a signing of the single sign-on computation closure for authentication of the single sign-on computation closure to the one or more computation entities. The signing of the single sign-on computation closure ensures the authentication of the single sign-on closure so that the computation entities receiving the single sign-on closure would know that the single sign-on closure was generated by a trusted source.

In one embodiment, per step 309 of FIG. 3, the authentication module 205 executes and/or facilitates execution of the single sign-on computation closure to sign the one or more computation entities, wherein the signing of the one or more computation entities authenticates the one or more computation entities for operation under the single sign-on authentication session. The authentication module 205 may verify the signature of the single sign-on computation closure to verify the authentication of the single sign-on prior to the execution of the single sign-on closure for signing the one or more computation entities. The execution of the single sign-on closure causes the computation entities to be signed with a unique single sign-on signature which is common among all the computation entities involved in the session.

In one embodiment, per step 311 of FIG. 3, the computation validation module 209 processes and/or facilitates a processing of the single sign-on computation closure to validate the at least one other computation closure executing at the one or more computation entities. In one embodiment, one or more other computation closures associated with one or more processes of UE 107a-107i or one or more processes of clouds 111a-111n, or a combination thereof, which may be stored at a local storage of the UEs 107a-107i (not shown) or at the computation stores 115a-115a, or a combination thereof, may be assigned to one or more computation entities for execution. In this embodiment, the computation validation module 209 validates the computation closures by verifying the single sign-on signatures associated with the computation entities.

In one embodiment, if at least one other computation closure is not validated, per step 313 of FIG. 3, the computation validation module 209 per step 315 causes, at least in part, a stopping of an execution of the at least one other computation closure at the one or more computation entities. Otherwise, if no invalid closures are determined, the execution will continue until it is completed.

In one embodiment, upon completion of the execution of other computation closures by the computation entities, per step 317 of FIG. 3 the single sign-on closure generator 201 may cause, at least in part, reuse of the single sign-on computation closure for signing of the one or more computation entities under one or more subsequent single sign-on authentication sessions. In one embodiment, the single sign-on closure generator 201 may store the used single sign-on closure, for example in storage 211, for further use for subsequent sessions. The reuse of single sign-on closures may increase the signing efficiency, especially for processes with frequent recurring computations and involving a specified set of computation entities.

In one embodiment, upon the completion of the execution of one or more other computation closures, the signature revocation module 207 determines a termination of the single sign-on authentication session (per step 319). In this embodiment, the end of session may be determined by the computation entities executing the one or more other computation closures upon completion of the execution, by the user upon receiving the computation results, or a combination thereof. The signature revocation module 207 may also cause, at least in part, a revocation of the signing of the one or more computation entities. Although it may not be necessary for the single sign-on computation closure to be deleted or somehow invalidated/deactivated after the session is closed, but in one embodiment, per step 321 of FIG. 3, the signature revocation module 207 may clean up the signed computation entities from any obsolete and/or outdated signatures. The clean up process may increase the efficiency of the single sign-on mechanism and reduce the amount of storage used for signature related data.

Figure 4A:
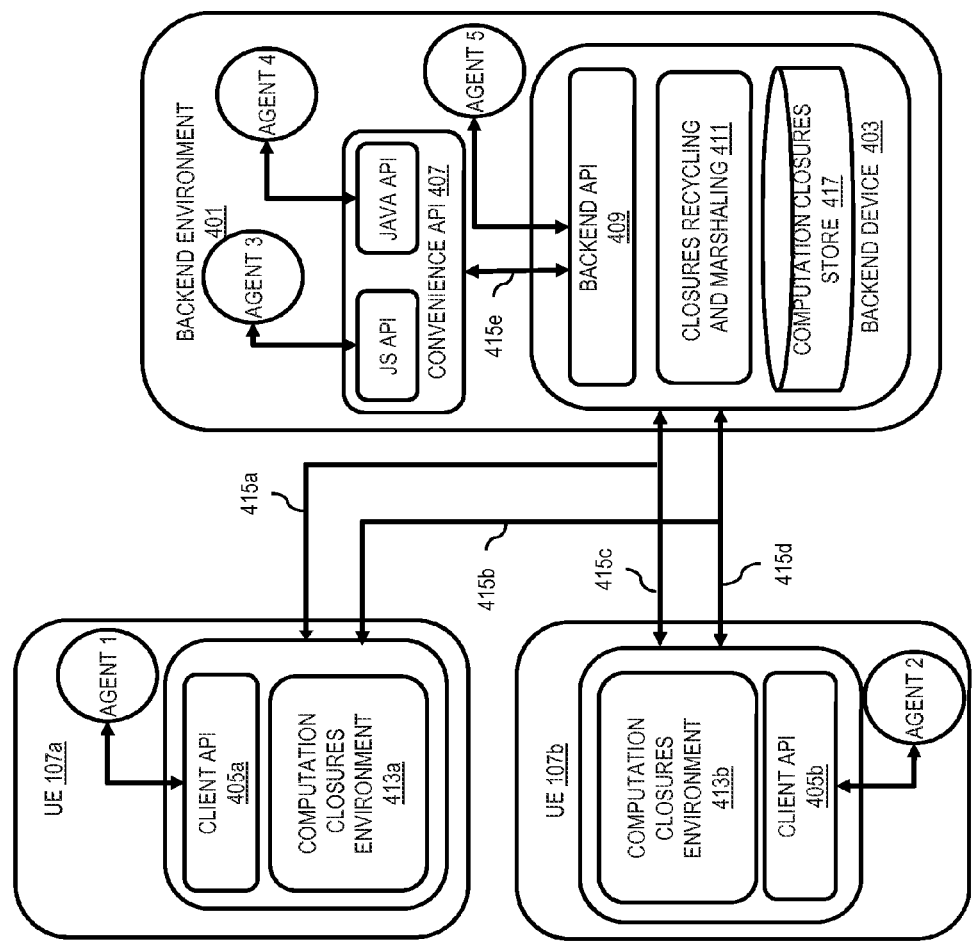
FIGS. 4A-4B are diagrams of computation distribution among devices, according to one embodiment.
Figure 4B:
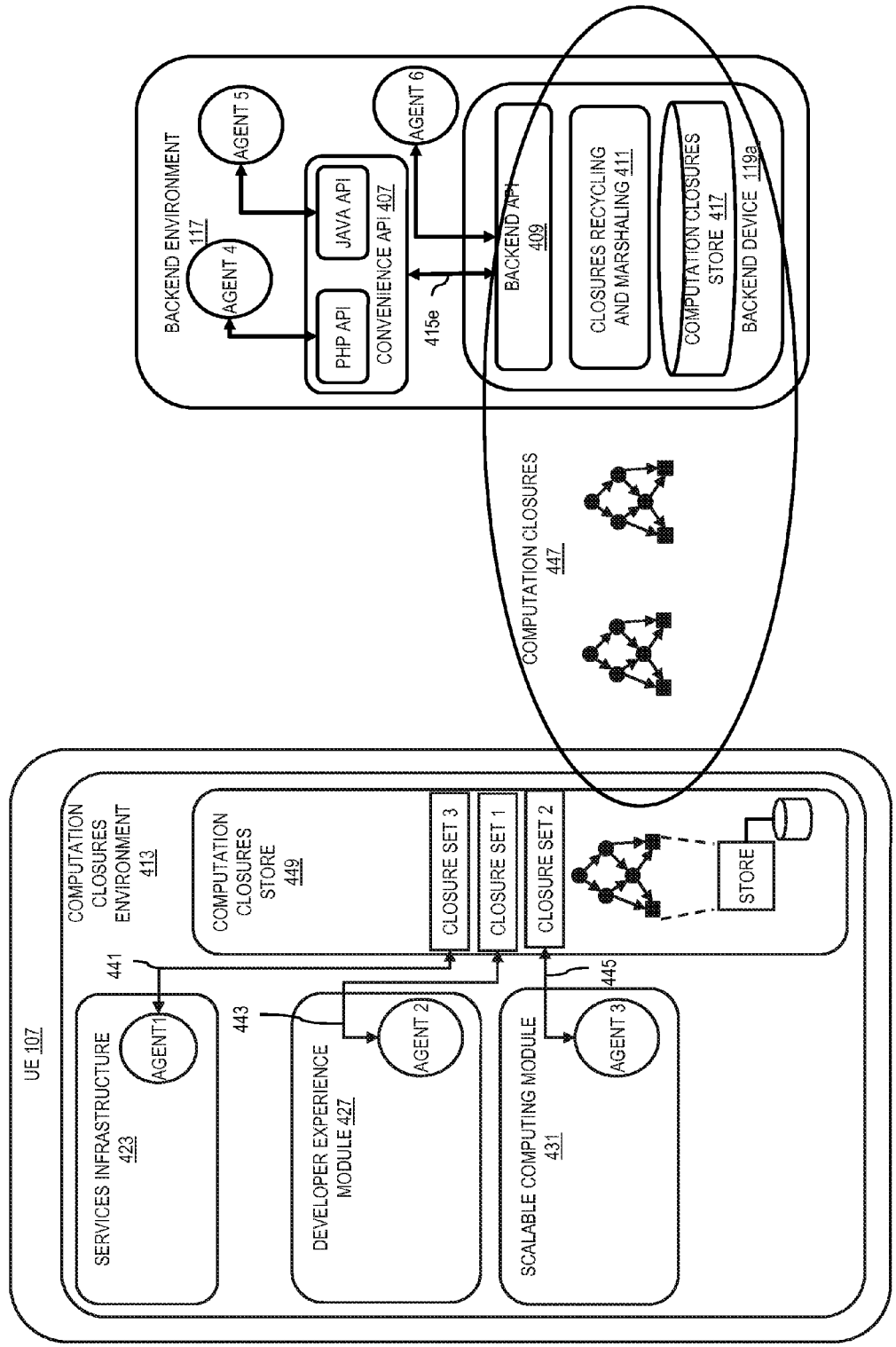

FIGS. 4A-4B are diagrams of computation distribution among devices, according to one embodiment. In one embodiment, in FIG. 4A, the backend environment 401 may consist of one or more devices or a virtual run-time environment within a cloud 111 associated with the owner of UE 107a or on another UE 107b associated with the user. The backend environment 401 may include one or more components (backend devices) 403 and one or more Application Programming Interface (API) such as a convenience API 407 that may include APIs tailored to the software development environments used (e.g. JAVA, PHP, etc.). Furthermore, UEs 107a and 107b may include client APIs 405a and 405b. Each API enables interaction between devices and components within another device or an environment. For example, backend API 409 enables interaction between the backend device 403 and Agent5, and convenience API 407 enables interaction between the backend device 403 and agents Agent3 and Agent4, wherein each agent is a set of processes that handle computation closures within the backend environment 401. APIs 405a and 405b enable interaction between UE 107a and agent Agent1, and UE 107b and agent Agent2 respectively. As seen in the example of FIG. 4A, Agent3 works under PHP while Agent4 is a JAVA process. Each of the UEs 107a and 107b has a computation closure environment 413a and 413b which may be part of a cloud 111. Arrows 415a-415e represent distribution path of computation closures among the environments 413a, 413b and the computation closures store 417. The computation closures store 417 is a repository of computation closures that can be accessed and used by all the UEs and infrastructure components having connectivity to the backend environment 401.

In one embodiment, the backend device 403 may be equipped with a closure recycling and marshaling component 411 that monitors and manages any access to the computation closures store 417. In other embodiments the closure recycling and marshaling (i.e. standardization for uniform use) may be a function of the single sign-on management platform 103.

In one embodiment, the computation closures within environments 413a, 413b and the computation closures store 417 may be composed based on anonymous function objects and automatically created by a compiling system using methods for generating anonymous function objects such as lambda expressions.

FIG. 4B is an expanded view of a computation closure environment 413 as introduced in FIG. 4A. The computation closure environment 413 may be composed of one or more computation closure generating components. In one embodiment the computation closure environment 413 has a services infrastructure 423 that provides various services for the user of the UE 107. The services may include any application that can be performed on the UE 107 such as, games, music, text messaging, voice calls, etc. In one embodiment, the services infrastructure 423 provides support for closure distribution under the supervision of a single sign-on management platform 103 as discussed in FIG. 1, FIG. 2, and FIG. 3. The agent Agent1 retrieves the computation closures required by the services infrastructure 423 from the computation closures store 449 and stores the newly generated computation closures by the services infrastructure 423 into the computation closures store 449 for distribution purposes per arrow 441.

In another embodiment, the computation closure environment 413 has a developer experience module 427 that provides various tools for a developer for manipulating services offered by the UE 107. The tools may include standardized and/or abstract data types and services allowing the developers to chain processes together across development platforms. In one embodiment, the developer experience module 427 provides cross platform support for abstract data types and services under the supervision of a single sign-on management platform 103 as discussed in FIG. 1. The agent Agent2 retrieves the computation closures required by the developer experience module 427 from the computation closures store 449 and stores the newly generated computation closures by the developer experience module 427 into the computation closures store 449 for distribution purposes per arrow 443.

In yet another embodiment, the computation closure environment 413 has a scalable computing module 431 that provides an abstract wrapper (i.e. monadic wrapper) for the migrating closures 401. This abstraction provides computation compatibility between the closures 401 and the UE 107. The abstract wrapper may provide scheduling, memory management, system calls and other services for various processes associated with the closures 401. These services are provided under the supervision of the single sign-on management platform 103 as discussed in FIG. 1. The agent Agent3 retrieves the computation closures required by the scalable computing module 431 from the computation closures store 449 and stores the newly generated computation closures by the scalable computing module 431 into the computation closures store 449 for distribution purposes per arrow 445. In one embodiment, the backend environment 401 may access the computation closures store 449 and exchange/migrate one or more computer closures 447 between the computation closures store 449 and the backend computation closures store 417.

Figure 5:
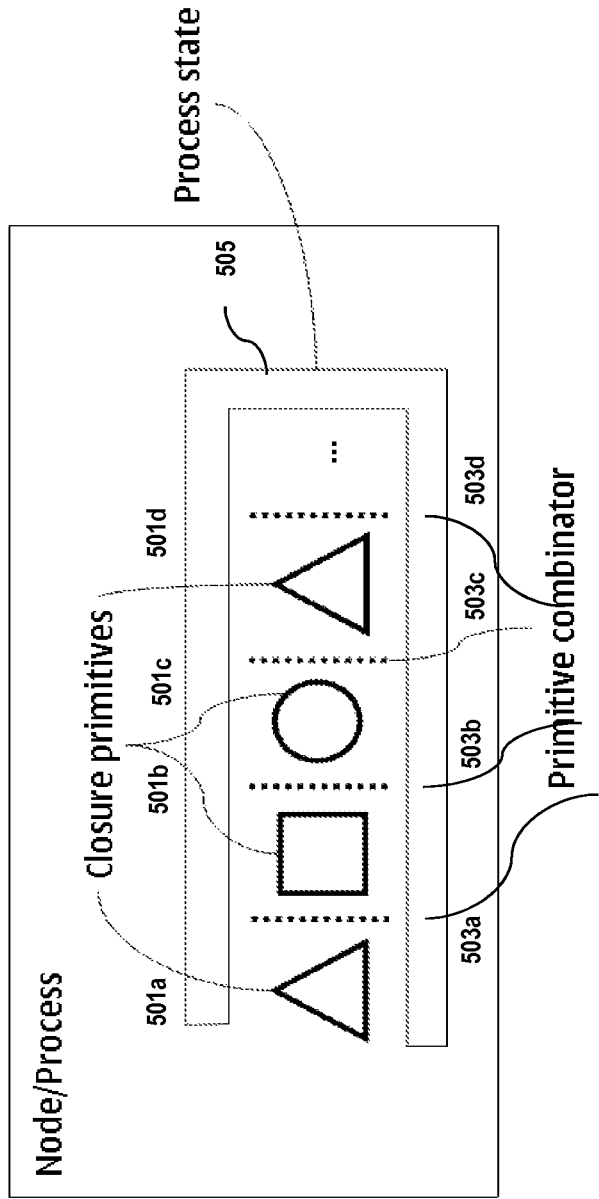
FIG. 5 is a diagram showing a process as a combination of primitive computation closures, according to one embodiment.

FIG. 5 is a diagram showing a process as a combination of primitive computation closures, according to one embodiment. Process 500 consists of closure primitives 501a-501d. The closure primitives 501a-501d, are combined with each other into process 500 by combinators 503a-503d. The object 505 represents the execution requirements including process states under which the execution of closures 501a-501d combined by combinators 503a-503d will result in the process 500.

In one embodiment, distribution of process 500 includes distribution of closures 501a-501d, combinators 503a-503d and the process states 505 as independent elements into, for instance, a backend environment 111. The independent closures 501a-501d from backend environment 111 may be distributed into different components (e.g. computation entities) where they may be executed.

Figure 6:
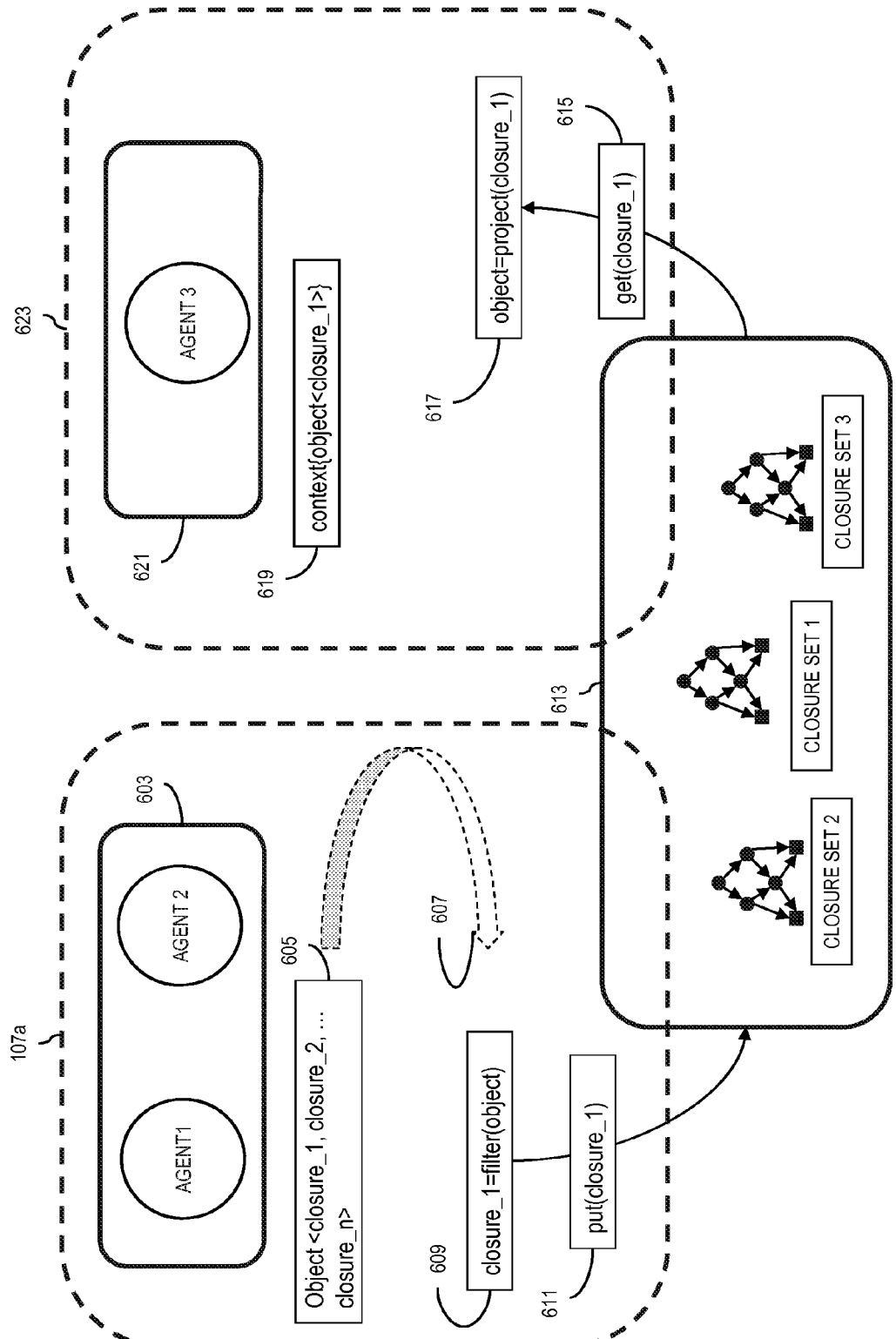
FIG. 6 is a diagram of process distribution from a device to another device, according to one embodiment. In one embodiment, the device 107*a* is a UE associated with the user.

FIG. 6 is a diagram of process distribution from a device to another device, according to one embodiment. In one embodiment, the device 107a is a UE associated with the user. The UE 107a may include a user context 603 which is being migrated among devices. Agent1 and agent2 are processors that calculate and handle computation closures within the user context 603. The number of agents may be different in different devices based on their design, functionality, processing power, etc. Block 605 represents an Object as a set of computation closures, closure_1, closure_2, . . . , and closure_n, where each closure is a component of a larger process, for example, related to a service provided to the user by the user equipment 107a. Each closure is a standalone process that can be executed independently from the other closures. In the example of FIG. 6, the filtering process 607 extracts closure_1 from the closure set Object via filtering the set (shown in block 609). The extracted closure_1 is added to a computation closure store 613 using the exemplary Put command 611.

It is assumed, in this example, that component 623 of an infrastructure level (not shown) or a cloud 111 is selected by the single sign-on management platform 103 as a destination for closure distribution from UE 107a, based on the availability of sufficient security. The extracted computation closure, closure_1 is migrated to component 623 following the assignment of a distribution path, and is executed on component 623.

In one embodiment, the component 623 receives the computation closure closure_1 and extracts it from the computation closure store 613 using the Get command 615. The extracted closure_1 is projected into a closure with the user device context and the object 617 is produced. The block 619 represents the reconstruction of the closure into the initial context by a component in charge of the execution. The aggregated context may then be executed in the run-time environment 621 of component 119a by Agent3.

In another embodiment, the UE 107a and component 623 may exchange places and the distribution is performed from the component 623 to UE 107*a* or both devices may be UEs. In this embodiment the decomposition and aggregation processes are similar to the above example.

Figure 7:
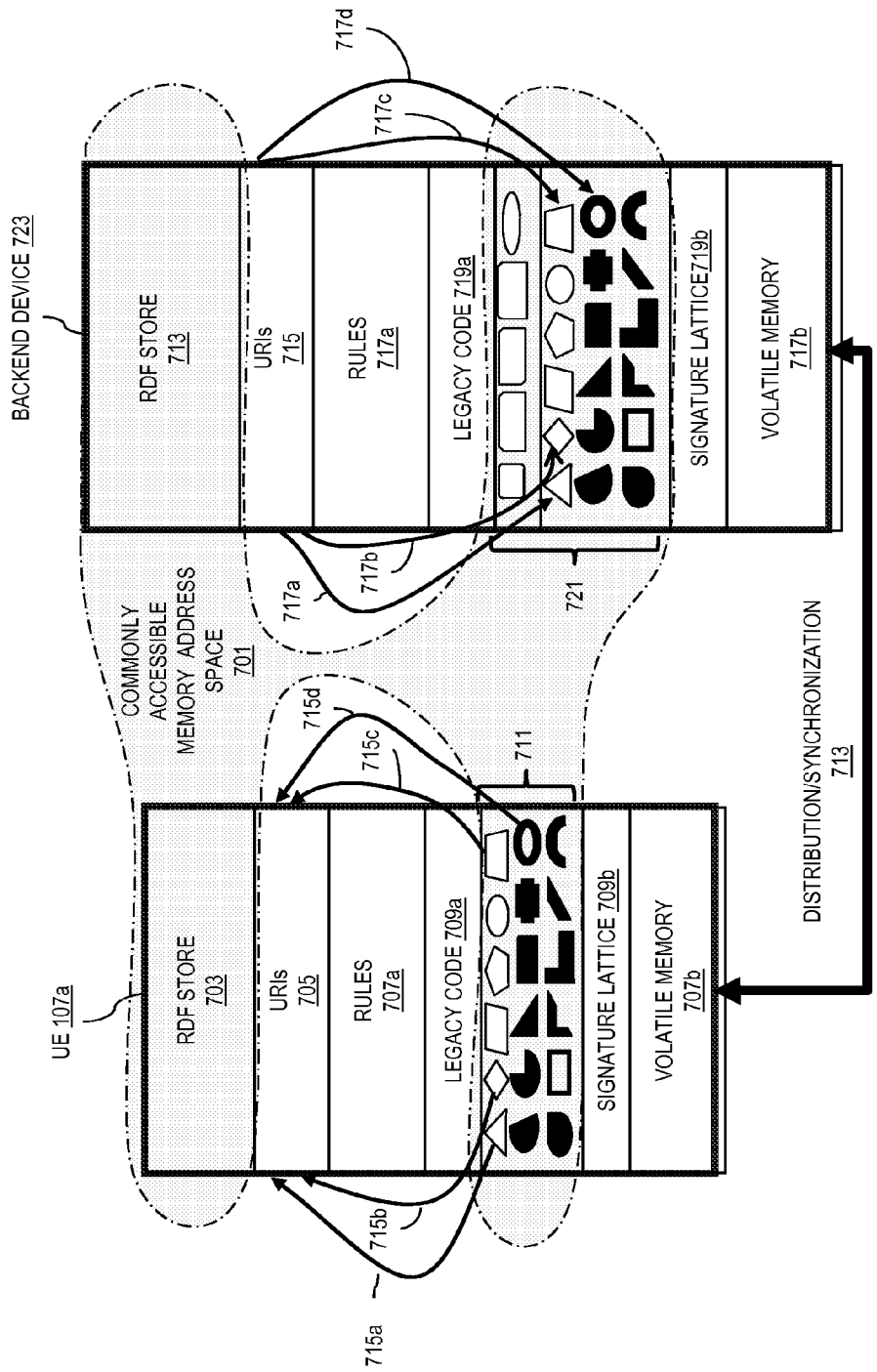
FIG. 7 is a diagram of computation closure allocation/mapping, according to one embodiment.

FIG. 7 is a diagram of computation closure allocation/mapping, according to one embodiment. The diagram of FIG. 7 shows a commonly accessible memory address space 701 formed between a UE 107*a* as a client and the backend device 723 as a component of a cloud 111.

In one embodiment, the UE 107*a* may include RDF store 703, which holds computation closures for processes associated with the UE 107*a*. Similarly the backend device 723 may includes a RDF store 713, which holds computation closures associated with processes related to device 723, UEs 107*a*-107*i*, or any other devices having connectivity to device 723 or cloud 111.

In other embodiments, the Uniform Resource Identifiers (URIs) 705 in UE 107*a* and 715 in backend device 723 may be used to identify names or resources accessible to their respective devices via the communication network 105. Additionally, UE 107*a* and backend device 723 may have rule sets 707*a* and 717*a* that include security rules imposed on the device. It is noted that the rule base 707*a* of UE 107*a* may be a subset of the rule base 717*a* of the backend device 723, wherein the rules 717*a* is a subset of a superset of rules managed by a cloud 111. Furthermore, the legacy codes associated with each device may be stored in legacy code memory areas 709*a* and 709*b* on UE 107*a* and 719*a* and 719*b* on backend device 723.

In one embodiment, UE 107*a* may be provided with a non-volatile memory space 711 as a closure store. The closure store 711 may include a set of closure primitives shown as geometric objects. Similarly, the backend device 723 may be provided with a non-volatile memory space 721 as a closure store. The closure store 721 may also include a set of closure primitives shown as geometric objects. In one embodiment, the closure store 711 is a subset of closure store 721 determined, at least in part, based on one or more criteria such as time of access, frequency of access, a priority classification, security settings, etc. The geometric shapes of closure stores 711 and 721 have been each divided into two groups of solidly filled geometric shapes (representing signed closures) and unfilled geometric shapes (representing unsigned closures). Since non-volatile memories are costly and require extensive resources (e.g. power consumption) compared with volatile memories (such as 707*a*, 707*b*, 717*a*, and 717*b*), the capacity of non-volatile memory on a UE 107*a*-107*i* is limited. However, a backend device 723, serving high numbers of users, may be equipped with larger volumes of non-volatile memory spaces. Because of the limited capacity of non-volatile memory spaces on UEs 107*a*-107*i*, and also because differing levels of security setup on various devices, only a subset of the closure store 721 is stored locally at the closure store 711 for local use by the UE 107*a*. In order to minimize the number of times a UE 107 needs to retrieve one or more primitives from closure store 721 of device 109*a*, the subset 711 is determined based on one or more criteria. In one embodiment, the closure store 711 may be determined as a set of the most frequently accessed closure primitives of closure store 721 by UE 107*a*. In another embodiment, the closure store 711 may be determined as a set of the most recently accessed closure primitives of closure store 721 by UE 107*a*. In other embodiments, various combined conditions and criteria may be used for determining subset 711 from set 721 as the content of closure store for UE 107*a*. Furthermore, the closure stores 711 and 721 may be periodically synchronized. The synchronization of closure stores ensures that any changes (addition, deletion, modification, etc.) in closure primitives and in root elements of the signature lattice of closure store 721 are reflected in the closure store 711.

In one embodiment, for execution of a subset of closure store 711 associated with a process on UE 107*a*, the closure set can be signed under the supervision of the single sign-on management platform 103 and after verification of the signatures of closures and capabilities and authentication of the destination computation entities, to the backend device 723 which is a component of the cloud 111 (the distribution path shown as arrow 713). The single sign-on management platform 103 may then inform the computation entities of the UE 107*a*, the backend device 723 or a combination thereof (the computation entities are not shown), that the authentication of closure primitives has been approved and the closures are ready for execution. Alternatively, the single sign-on management platform 103 may determine that the closures are not approved from point of view of the security and terminate their distribution and execution. Additionally, the single sign-on management platform 103 may disapprove validation of one or more of the computation entities. Similarly in this case the single sign-on management platform 103 may terminate the execution of the closures by the invalid computation entities.

In one embodiment, any changes on the closure store 721 of the backend device 723 (e.g., addition, deletion, modification, etc.) may first enter the URIs 715 via the communication network 105. The changes may then be applied from URIs 715 on closure store 721 shown by arrows 727*a*-727*d*. Similarly, the closure store 711 is updated based on the content of the closure store 721 and the updates are shared with other authorized components within UE 107*a* (e.g. with URIs 705 as shown by arrows 725*a*-725*d*).

In one embodiment, the commonly accessible memory address space 701 is formed from the RDF stores 703 and 713 and the closure stores 711 and 721. The commonly accessible memory address space 701 can be accessed as a continuous memory space by each of the devices 107*a* and 723.

The processes described herein for providing single sign-on for computation closures may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
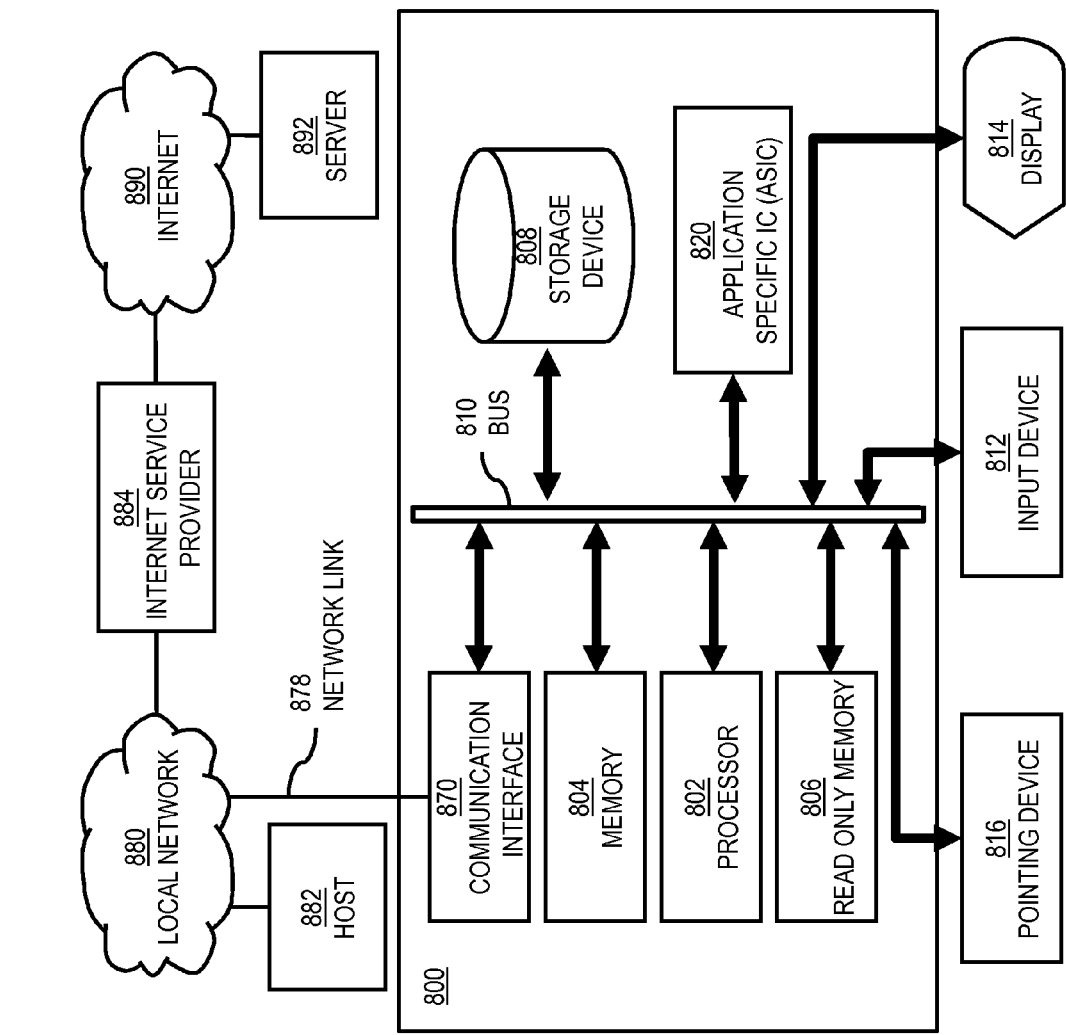
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide single sign-on for computation closures as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing single sign-on for computation closures.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing single sign-on for computation closures. The computer program code is a set of instructions or statements providing instructions for the operation of the processor and/or the computer system to perform specified functions. The code, for example, may be written into a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing single sign-on for computation closures. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing single sign-on for computation closures, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing single sign-on for computation closures to the UEs 107*a*-107*i* of UE sets 101*a*-101*n*.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

Figure 9:
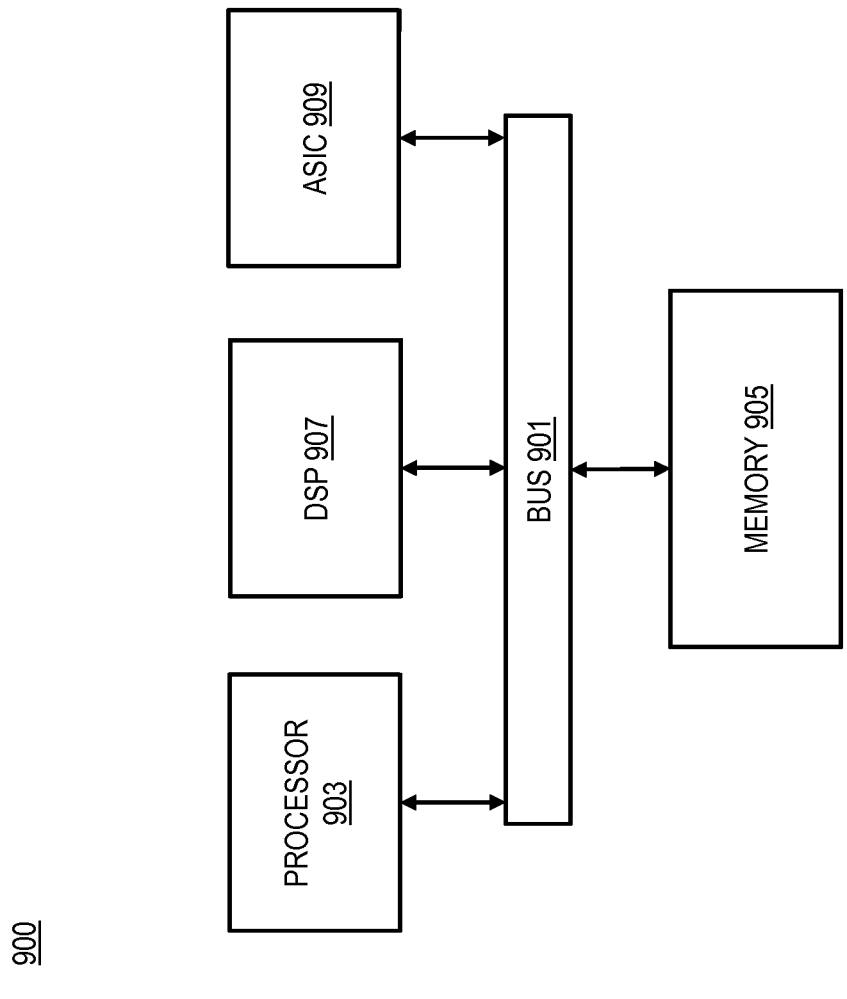
FIG. 9 is a diagram of a chip set that can be used to implement an embodiment of the invention.

FIG. 9 illustrates a chip set or chip 900 upon which an embodiment of the invention may be implemented. Chip set 900 is programmed to provide single sign-on for computation closures as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing single sign-on for computation closures.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide single sign-on for computation closures. The memory 905 also stores the data associated with or generated by the execution of the inventive steps.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing single sign-on for computation closures. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing single sign-on for computation closures. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide single sign-on for computation closures. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    a single sign-on computation closure created in response to an initiation of a single sign-on authentication session;
    one or more computation entities that are to execute at least one other computation closure under the single sign-on authentication session; and
    at least one determination, by at least one processor, to transfer the single sign-on computation closure to the one or more computation entities.

2. A method of claim 1, wherein the (1) data and/or (2) information and/or (3) at least one signal are further based, at least in part, on the following:
    at least one execution of the single sign-on computation closure to sign the one or more computation entities,
    wherein the signing of the one or more computation entities authenticates the one or more computation entities for operation under the single sign-on authentication session.

3. A method of claim 2, wherein the (1) data and/or (2) information and/or (3) at least one signal are further based, at least in part, on the following:
    a termination of the single sign-on authentication session; and
    a revocation of the signing of the one or more computation entities.

4. A method of claim 1, wherein the (1) data and/or (2) information and/or (3) at least one signal are further based, at least in part, on the following:
    a processing of the single sign-on computation closure to validate the at least one other computation closure executing at the one or more computation entities.

5. A method of claim 4, wherein the (1) data and/or (2) information and/or (3) at least one signal are further based, at least in part, on the following:
    at least one determination that the at least one other computation closure is not valid under the single sign-on authentication session; and
    a stopping of an execution of the at least one other computation closure at the one or more computation entities.

6. A method of claim 1, wherein the (1) data and/or (2) information and/or (3) at least one signal are further based, at least in part, on the following:
    a signing of the single sign-on computation closure for authentication of the single sign-on computation closure to the one or more computation entities.

7. A method of claim 1, wherein the (1) data and/or (2) information and/or (3) at least one signal are further based, at least in part, on the following:
    at least one reuse of the single sign-on computation closure for signing of the one or more computation entities under one or more subsequent single sign-on authentication sessions.

8. A method of claim 1, wherein the one or more computation entities operate at one or more levels of a computational architecture.

9. An apparatus comprising:
    at least one processor; and
    at least one memory including computer program code for one or more programs, the at least one memory and the computer program code configured to, with the at least one processor, cause the apparatus to perform at least the following, determine to create a single sign-on computation closure in response to an initiation of a single sign-on authentication session;

determine one or more computation entities that are to execute at least one other computation closure under the single sign-on authentication session; and cause, at least in part, a transfer of the single sign-on computation closure to the one or more computation entities.

10. An apparatus of claim 9, wherein the apparatus is further caused to:

execute and/or facilitate an execution of the single sign-on computation closure to sign the one or more computation entities, wherein the signing of the one or more computation entities authenticates the one or more computation entities for operation under the single sign-on authentication session.

11. An apparatus of claim 10, wherein the apparatus is further caused to:

determine a termination of the single sign-on authentication session; and cause, at least in part, a revocation of the signing of the one or more computation entities.

12. An apparatus of claim 9, wherein the apparatus is further caused to:

process and/or facilitate a processing of the single sign-on computation closure to validate the at least one other computation closure executing at the one or more computation entities.

13. An apparatus of claim 12, wherein the apparatus is further caused to:

determine that the at least one other computation closure is not valid under the single sign-on authentication session; and cause, at least in part, a stopping of an execution of the at least one other computation closure at the one or more computation entities.

14. An apparatus of claim 9, wherein the apparatus is further caused to:

cause, at least in part, a signing of the single sign-on computation closure for authentication of the single sign-on computation closure to the one or more computation entities.

15. An apparatus of claim 9, wherein the apparatus is further caused to:

cause, at least in part, reuse of the single sign-on computation closure for signing of the one or more computation entities under one or more subsequent single sign-on authentication sessions.

16. An apparatus of claim 9, wherein the one or more computation entities operate at one or more levels of a computational architecture.

17. A non-transitory computer-readable storage medium carrying one or more sequences of one or more instructions which, when executed by one or more processors, cause an apparatus to at least perform the following steps:

determining to create a single sign-on computation closure in response to an initiation of a single sign-on authentication session;

determining one or more computation entities that are to execute at least one other computation closure under the single sign-on authentication session; and causing, at least in part, a transfer of the single sign-on computation closure to the one or more computation entities.

18. A non-transitory computer-readable storage medium of claim 17, wherein the apparatus is caused to further perform:

executing and/or facilitating an execution of the single sign-on computation closure to sign the one or more computation entities, wherein the signing of the one or more computation entities authenticates the one or more computation entities for operation under the single sign-on authentication session.

19. A non-transitory computer-readable storage medium of claim 18, wherein the apparatus is caused to further perform:

determining a termination of the single sign-on authentication session; and causing, at least in part, a revocation of the signing of the one or more computation entities.

20. A non-transitory computer-readable storage medium of claim 17, wherein the apparatus is caused to further perform:

processing and/or facilitating a processing of the single sign-on computation closure to validate the at least one other computation closure executing at the one or more computation entities.

* * * * *